US008963771B1

(12) United States Patent
Schiffmiller

(10) Patent No.: US 8,963,771 B1
(45) Date of Patent: Feb. 24, 2015

(54) CLOSEST TO OPTIMAL ANSWER SELECTION TECHNIQUE FOR SINGLE-SHIP GEOLOCATION

(75) Inventor: Richard Schiffmiller, Teaneck, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 412 days.

(21) Appl. No.: 13/523,618

(22) Filed: Jun. 14, 2012

Related U.S. Application Data

(60) Provisional application No. 61/499,916, filed on Jun. 22, 2011.

(51) Int. Cl.
G01S 13/06 (2006.01)
G01S 13/00 (2006.01)
G01S 19/42 (2010.01)
G01S 13/87 (2006.01)

(52) U.S. Cl.
CPC .............. G01S 13/003 (2013.01); G01S 19/42 (2013.01); G01S 13/878 (2013.01)
USPC ........... 342/140; 342/146; 342/147; 342/450; 342/463

(58) Field of Classification Search
CPC ........ G01S 7/021; G01S 19/42; G01S 13/86; G01S 13/003; G01S 13/878; G01S 5/00; G01S 5/02
USPC ......... 342/140, 146–147, 417, 443, 450–451, 342/463
See application file for complete search history.

(56) References Cited

U.S. PATENT DOCUMENTS

| 4,152,700 | A | * | 5/1979 | Bodnar .......................... 342/135 |
| 4,649,390 | A | * | 3/1987 | Andrews et al. ............... 342/140 |
| 5,389,936 | A | * | 2/1995 | Alcock .......................... 342/465 |
| 5,874,918 | A | * | 2/1999 | Czarnecki et al. ............. 342/417 |
| 6,714,155 | B1 | * | 3/2004 | Rose .............................. 342/107 |

(Continued)

FOREIGN PATENT DOCUMENTS

GB 2430100 A * 3/2007

OTHER PUBLICATIONS

Okello, N., "Emitter Geolocation with Multiple UAVs," Information Fusion, 2006 9th International Conference on, vol., no., pp. 1,8, Jul. 10-13, 2006.*

(Continued)

*Primary Examiner* — John B Sotomayor
(74) *Attorney, Agent, or Firm* — Finch & Maloney PLLC; Daniel J. Long

(57) ABSTRACT

Techniques are disclosed for selecting a closest to optimal radar/emitter location for single-ship applications. In accordance with some embodiments, given single-ship geolocation estimates are organized so that clusters of those estimates can be identified, wherein optimal solutions may be found in consecutive, adjacent segments of distance (bins) along each axis of given a coordinate system. Once the clusters are identified in each axis, an optimal cluster can be selected for each. To determine the closest answer to optimal, the coordinate data points in each of the optimal clusters can be averaged (or other sound mathematical process) for each axis in the coordinate system, so as to provide an optimal 3-D coordinate in the given coordinate system. In other embodiments, the optimal 3-D coordinate can be further used to establish an origin in a second coordinate system (e.g., for conversion from 3-D to 2-D coordinate system).

24 Claims, 6 Drawing Sheets

(56) References Cited

U.S. PATENT DOCUMENTS

| | | | |
|---|---|---|---|
| 6,801,152 B1* | 10/2004 | Rose | 342/13 |
| 6,933,888 B1* | 8/2005 | Schiffmiller et al. | 342/387 |
| 7,315,280 B2* | 1/2008 | Schiffmiller et al. | 342/387 |
| 7,626,538 B2* | 12/2009 | Rose | 342/195 |
| 7,626,546 B2* | 12/2009 | Chung et al. | 342/465 |
| 7,916,066 B1* | 3/2011 | Osterweil | 342/28 |
| 8,068,051 B1* | 11/2011 | Osterweil | 342/28 |
| 8,706,414 B2* | 4/2014 | Funk et al. | 701/495 |
| 2004/0136439 A1* | 7/2004 | Dewberry et al. | 375/130 |
| 2004/0207553 A1* | 10/2004 | Rose | 342/146 |
| 2005/0089083 A1* | 4/2005 | Fisher et al. | 375/130 |
| 2005/0208952 A1* | 9/2005 | Dietrich et al. | 455/456.1 |
| 2005/0275588 A1* | 12/2005 | Schiffmiller et al. | 342/387 |
| 2008/0077326 A1* | 3/2008 | Funk et al. | 701/220 |
| 2008/0088508 A1* | 4/2008 | Smith | 342/453 |

OTHER PUBLICATIONS

Warner, J.G.; Middour, J.W., "Radar transmitter geolocation via novel observation technique and particle swarm optimization," Aerospace Conference, 2012 IEEE, vol., no., pp. 1,9, Mar. 3-10, 2012.*

Rong Yang; Pek Hui Foo; Boon Poh Ng; Gee-Wah Ng, "RF Emitter Geolocation using Amplitude Comparison with Auto-Calibrated Relative Antenna Gains," Aerospace and Electronic Systems, IEEE Transactions on , vol. 47, No. 3, pp. 2098,2110, Jul. 2011.*

* cited by examiner

CLOSEST TO OPTIMAL ANSWER SELECTION TECHNIQUE FOR SINGLE-SHIP GEOLOCATION

RELATED APPLICATIONS

This application claims the benefit of U.S. Provisional Application No. 61/499,916, filed Jun. 22, 2011.

FIELD OF THE DISCLOSURE

The present application relates to geolocation and more particularly to determining an optimal geolocation from many geolocation estimates.

BACKGROUND

When a military aircraft detects pulsed radiation from a ground-based radar, determining the position of the radar emitter allows for successful evasion, countermeasure deployment, and any neutralization efforts. Methods for finding such radar positions are generally referred to as "geolocation." Geolocation may be performed using multiple sensors mounted on different host platforms (sometimes referred to as multi-ship geolocation), or by using a sensor or sensors mounted on a single host platform (single-ship geolocation). There are a number of non-trivial issues associated with single-ship geolocation.

SUMMARY

One embodiment of the present invention provides a method for locating a radar emitter. The method includes identifying a plurality of clusters of radar emitter geolocation data in a first axis of a first coordinate system, wherein each cluster includes a population of geolocation data points and is bound by delimiters. The method further includes identifying, among the plurality of clusters, a main cluster having the largest population of geolocation data points. The method further includes computing an average coordinate value from the geolocation data points in the main cluster, thereby providing at least part of an optimal emitter geolocation coordinate. In some cases, the method includes at least one of: repeating the method for a second axis of the first coordinate system, thereby providing another part of the optimal emitter geolocation coordinate; and repeating the method for a third axis of the first coordinate system, thereby providing another part of the optimal emitter geolocation coordinate. In some cases, the delimiters that bound the clusters include at least one of bins having a count at or below a given threshold, a first distance specifying a beginning of the dynamic range reflected in the geolocation data points of the radar emitter geolocation data, and a second distance specifying an end of the dynamic range reflected in the geolocation data points of the radar emitter geolocation data. In some cases, the count below a given threshold is zero (or some other suitable low count threshold, such as 1 or 2). In some cases, identifying a plurality of clusters includes determining a bin size for a histogram and populating the histogram (using the bin size) with the geolocation data points of the radar emitter geolocation data. In some such cases, determining the bin size includes: computing an average distance between the geolocation data points of the radar emitter geolocation data, when those data points are sequentially arranged in time; and computing the bin size based on the average distance and a total distance reflected in the geolocation data points of the radar emitter geolocation data. In other such example cases, the bin size is determined empirically. In some cases, the geolocation data points of the radar emitter geolocation data are earth-centered earth-fixed (ECEF) coordinates. In some cases, if two or more clusters have the same largest population of geolocation data points, then the cluster associated with the smaller distance is chosen as the main cluster. In some cases, the method further includes: identifying sub-clusters within the main cluster; combining spatially overlapping sub-clusters to form a sub-cluster having a larger population of geolocation data points; and identifying a sub-cluster having the largest population and rejecting lower population sub-clusters, thereby providing a refined main cluster. In one such case, if two or more sub-clusters have the same largest population of geolocation data points, then the sub-cluster that spans the longer distance is rejected. In another such case, identifying sub-clusters within the main cluster includes identifying time gaps between the geolocation data points when those data points are sequentially arranged in time, wherein a time gap is a delimiter between distinct sub-clusters. In some cases, the method further includes converting the geolocation data points of the radar emitter geolocation data to a second coordinate system using the optimal emitter geolocation coordinate as an origin, and repeating the method for each axis, or a subset of those axes, of the second coordinate system. In some cases, the method further includes the preliminary step of receiving the geolocation data points of the radar emitter geolocation data.

Another embodiment of the present invention provides a computer-readable medium storing instructions thereon that when executed by one or more processors, cause the following process for locating a radar emitter to be carried out: identifying a plurality of clusters of radar emitter geolocation data in a first axis of a first coordinate system, wherein each cluster includes a population of geolocation data points and is bound by delimiters; identifying, among the plurality of clusters, a main cluster having the largest population of geolocation data points; and computing an average coordinate value from the geolocation data points in the main cluster, thereby providing at least part of an optimal emitter geolocation coordinate. In some cases, the process further comprises at least one of: repeating the method for a second axis of the first coordinate system, thereby providing another part of the optimal emitter geolocation coordinate; and repeating the method for a third axis of the first coordinate system, thereby providing another part of the optimal emitter geolocation coordinate. In some cases, identifying a plurality of clusters comprises populating a histogram with the geolocation data points of the radar emitter geolocation data. In some cases, if two or more clusters have the same largest population of geolocation data points, then the cluster associated with the smaller distance is chosen as the main cluster. In some cases, the process further comprises: identifying sub-clusters within the main cluster; combining spatially overlapping sub-clusters to form a sub-cluster having a larger population of geolocation data points; and identifying a sub-cluster having the largest population and rejecting lower population sub-clusters, thereby providing a refined main cluster.

Another embodiment of the present invention provides a system for locating a radar emitter. The system includes a first module for identifying a plurality of clusters of radar emitter geolocation data in at least one axis of a coordinate system, wherein each cluster includes a population of geolocation data points and is bound by delimiters. The system further includes a second module for identifying, among the plurality of clusters, a main cluster having the largest population of geolocation data points. The system further includes a third module for computing an average coordinate value from the geolocation data points in the main cluster, thereby providing at least part of an optimal emitter geolocation coordinate. In one such example case, the system includes: a fourth module for identifying sub-clusters within the main cluster; a fifth module for combining spatially overlapping sub-clusters to form a sub-cluster having a larger population of geolocation data points; and a sixth module for identifying a sub-cluster having the largest population and rejecting lower population sub-clusters, thereby providing a refined main cluster. As will be appreciated in light of this disclosure, the functionality of these modules may be integrated into a different number of modules. The modules may be implemented in software, hardware, and/or firmware.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

Figure 1:
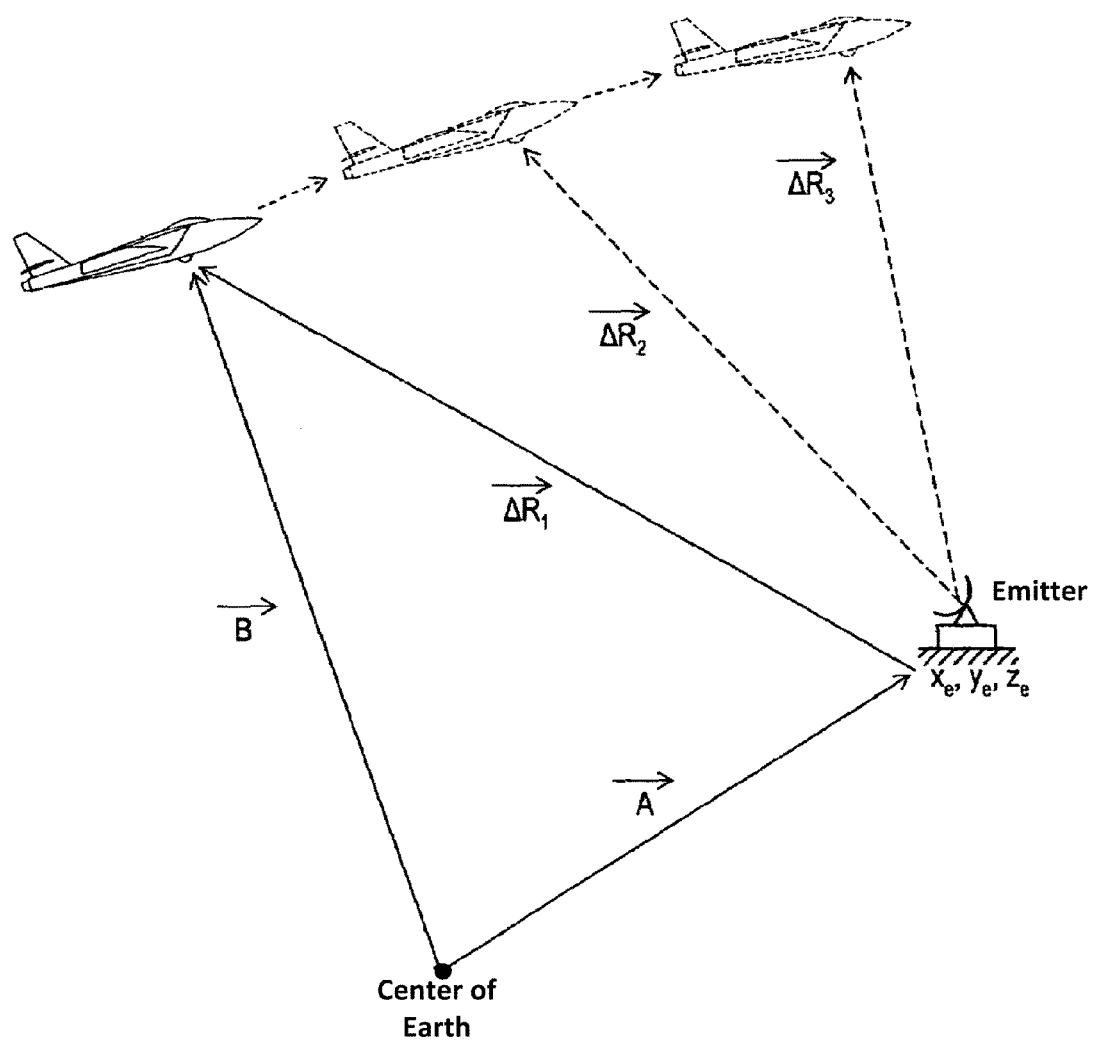
FIG. 1 is a schematic diagram illustrating a method of single-ship geolocation estimation methodology.

As will be appreciated, note that the drawings are not necessarily drawn to a particular scale, but are presented to facilitate explanation and understanding of the claimed invention.

DETAILED DESCRIPTION

Techniques are disclosed for determining a closest to optimal radar/emitter location for single-ship applications. In accordance with some embodiments, the techniques include plotting or otherwise organizing each axis of single-ship geolocation estimates and then identifying clusters of those geolocation estimates, such that potential optimal solutions may be found in consecutive, adjacent segments of distance (bins) along each axis of a coordinate system. Once these clusters are identified in each axis, an optimal cluster is selected for each axis. The cluster with the highest number of data points is chosen. If there are multiple clusters with a similar number of data points, then, of those, the cluster occurring over the smallest number of bins can be selected, in accordance with some such embodiments. To determine the closest answer to optimal, the coordinate data points of each geolocation estimate in the selected cluster are averaged for each axis in the coordinate system, in accordance with some such embodiments. In some example cases, the averaged values can be further used to establish an origin in a second coordinate system. The technique can be embodied, for example, in software, hardware, and/or firmware.

General Overview

As previously explained, there are a number of non-trivial issues associated with single-ship geolocation. In more detail, many single-ship systems collect radar data to assess changes in intervals between pulses of radiation to determine the change in position of the ship relative to the radar. From that data, the single-ship system will generate a solution representing an estimated location of the radar emitter. A geolocation estimate may be computed after each collection. This process can be repeated, for instance, about 20 to 30 times in a 30 second or more time period to continuously update the estimate. However, these individual geolocation estimates are subject to significant sources of error and often generate disparate results. While the estimate may improve over time, the last generated result is oftentimes not the best estimate. Given the multiple geolocation estimates available at the end of a collection cycle, it is not a trivial endeavor to identify which estimate is the best one to use, particularly given the long-standing approach of simply using the last generated result.

Thus, and in accordance with an embodiment of the present invention, techniques are provided for determining a closest to optimal estimated radar emitter location based on single-ship geolocation estimates. The estimated emitter location can then be used to achieve appropriate accuracy for defensive action. In one such embodiment, the techniques are implemented as an algorithm that can execute or otherwise run on the ship's on-board computing systems. The algorithm can be programmed or otherwise configured to find the best geolocation answer based on all available geolocation estimates. Note that this closest-to-optimal-answer-selection algorithm is independent of the geolocation algorithm that produces the geolocation estimates. In this sense, an embodiment of the present invention may be used to supplement such geolocation algorithms. In some example cases, the closest-to-optimal-answer-selection algorithm generally performs very well given many geolocation estimates from which to choose, but can also operate with only three or four geolocation estimates.

As will be appreciated in light of this disclosure, plots of single-ship geolocation results compared with the true emitter location generally indicate that the results tend to cluster around the true or otherwise best answer. The clusters, however, are not necessarily contiguous in time, and there may be many wild points and jumps in the results. Thus, in accordance with one example embodiment, the closest-to-optimal-answer-selection algorithm begins by creating a histogram of the available geolocation results in each spatial parameter (or each axis) represented in the 3-D dataset of the geolocation results. In more detail, the geolocation results are typically expressed in earth-centered earth-fixed (ECEF) coordinates, either cartesian-based where each geolocation result is represented by the 3-D spatial parameters of x, y, and z, or spherical-based where each geolocation result is represented by the 3-D spatial parameters of latitude, longitude, and altitude. Other suitable coordinate systems having any number of dimensions suitable for a given application may be used as well, as will be appreciated in light of this disclosure, and the claimed invention is not intended to be limited to any particular one. For purposes of simplifying the description and without loss of generality, assume that ECEF cartesian coordinates are used, in accordance with some embodiments. In such example cases, three histograms can be created, one for each of the x, y and z axes, for each geolocation estimate provided.

The bin width used can vary from one embodiment to the next, depending on the given application. In some embodiments, a fixed bin width can be used such as one in the range of 1 to 2 nautical miles, or a fractional standard unit of distance measurement such as a $\frac{1}{32}$, $\frac{1}{16}$, $\frac{1}{8}$, $\frac{1}{4}$, $\frac{1}{2}$, or $\frac{3}{4}$ nautical mile. In other embodiments, the differences between the adjacent coordinate values of the given geolocation estimates can be found and then averaged to determine the bin size for each histogram. In a more general sense, the bin width can be set to any distance suitable to a given application, so as to allow for meaningful clustering as described herein.

Once the x, y, and z histograms are created, the closest-to-optimal-answer-selection algorithm searches for all bin clusters, wherein a "bin" is defined as a segment of distance along an axis of a coordinate system and a "bin cluster" is defined as one or more consecutive adjacent bins containing non-zero counts and bounded by delimiters such as bins of count 0 (or some other relatively low count threshold such as 1 or 2) and/or the beginning and/or end of the histogram. The closest-to-optimal-answer-selection algorithm then selects the bin cluster with the largest population as the main cluster. In some such embodiments, if two or more clusters have the same number of hits, then the one with the fewest number of bins can be chosen as the main cluster. To determine the closest answer to optimal, the geolocation data points in the selected main cluster can be averaged for each axis in the coordinate system, in accordance with some embodiments, where sub-clustering is not performed.

In accordance with other embodiments, all the geolocation estimates over time that fall into the main cluster can then be tested for time gaps (non-adjacent estimates in time). These form sub-clusters within the main cluster. All combinations of sub-clusters are then considered to find spatially overlapping sub-clusters. The geolocation estimates in the spatially overlapping sub-clusters can then be combined to effectively form larger sub-clusters and low count sub-clusters can be rejected or otherwise ignored. An average of geolocation estimates in the remaining highest count sub-cluster is found. This entire procedure can then be repeated for each of the other two coordinates (axes) in each given geolocation estimate, so as to produce an optimal ECEF location, in accordance with some such embodiments.

In accordance with some embodiments, the resulting ECEF location (whether computed with or without sub-clustering) can be used as an origin to convert all the given geolocation estimates to another coordinate system, such as east/north/up (ENU) coordinate system. In one such embodiment, the up coordinate can be ignored as the emitter is fixed to the surface of the earth (so estimating an elevation is unnecessary). Terrain elevation maps such as Digital Terrain and Elevation Data (DTED) may be used as lookups to determine elevation, if necessary or otherwise desired. The histogram and clustering process is then repeated for the two coordinates, east and north. The final closest-to-optimal-answer-selection is the average of the clusters of east and north.

Note that a closest-to-optimal-answer-selection computed in accordance with an embodiment of the present invention need not be the same, in general, as any single geolocation estimate found by the geolocation algorithm. As a result, the closest-to-optimal-answer-selection may actually be better (closer to or otherwise at the true emitter location) than any of the geolocation estimates. And when it is not, it is close to the best geolocation estimate as determined by truth information.

Thus, an embodiment of the present invention provides an algorithm that examines all the available geolocation estimates and finds the location that is closest to the best solution based on the true emitter location. The algorithm has no knowledge of the true emitter location, and the resulting location may be closer to the true emitter location than the closest estimate from the geolocation algorithm. Such an algorithm provides superior performance to conventional techniques that simply use the last geolocation estimate at the end of the geolocation data collection, particularly when the last geolocation estimate is a poorer estimate than one computed earlier. In this sense, the techniques provided herein avoid wild point solutions.

Methodology

FIG. 1 shows a single-ship data emitter geolocation estimation system wherein a plurality of coordinate data points, labeled on FIG. 1 as $x_e$, $y_e$, $z_e$, are produced. In this example case, the system operates by referencing all vectors to a common reference, namely the center of the earth. Three sets of geolocation estimates are collected, each taken at different distances from the emitter and generally indicated by vectors $\Delta R_1$, $\Delta R_2$, $\Delta R_3$, respectively.

In an example embodiment of the present invention, the collected geolocation estimates can be used in a method for determining a closest to optimal radar/emitter location. In general, this example method identifies clusters of single-ship geolocation data wherein solutions may be found in consecutive, adjacent segments of distance (bins) along each axis of the ECEF coordinate system.

Figure 2:
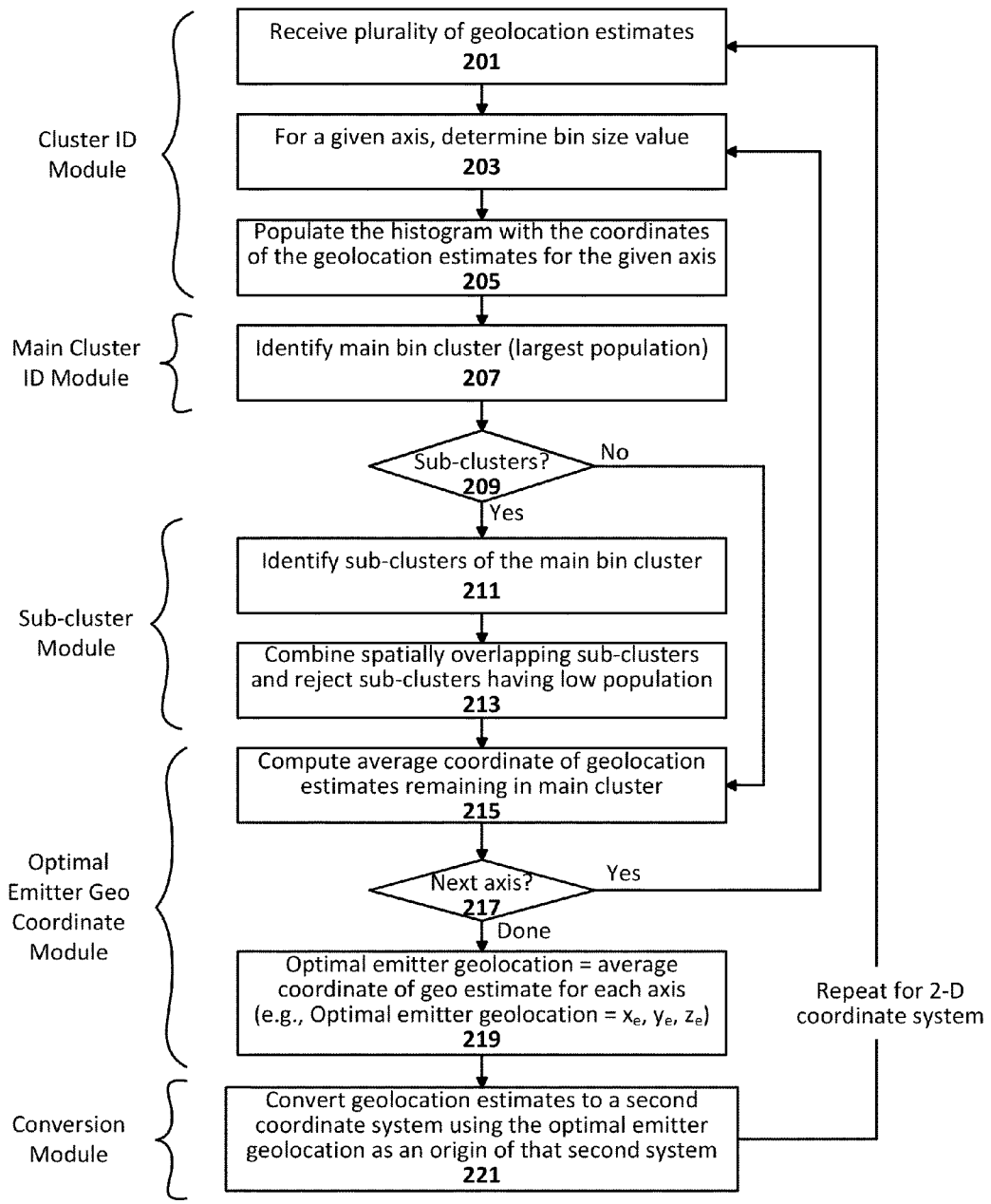
FIG. 2 illustrates a system and method for determining a closest to optimal radar/emitter location for single-ship applications, in accordance with an embodiment of the present invention.

FIG. 2 illustrates a system and method for determining a closest to optimal radar/emitter location for single-ship applications, in accordance with an embodiment of the present invention. As will be appreciated in light of this disclosure, the system/method can be implemented, for instance, in software instructions programmed into or otherwise executable by one or more processors of a computing system on-board or otherwise accessible to the collection platform. The instructions may be encoded in any suitable computer-readable medium accessible (e.g., ROM, flash, hard drive, server, memory stick, compact disc, or other such processor-readable mediums) by the processor. Alternatively, the method can be implemented in hardware modules such as gate level logic (e.g., ASIC or FPGA or purpose built silicon) configured to execute the methodology. Alternatively, the method can be implemented in firmware such as with a microcontroller having I/O capability (e.g., for receiving geolocation estimates and outputting an optimal location result) and a number of embedded routines or modules configured to execute the processes as variously described herein. Any number of such software, hardware, and/or firmware implementations (including any combinations thereof) for carrying out the locating methodology in accordance with an embodiment of the present invention can be used, as will be apparent in light of this disclosure.

Figure 3A:
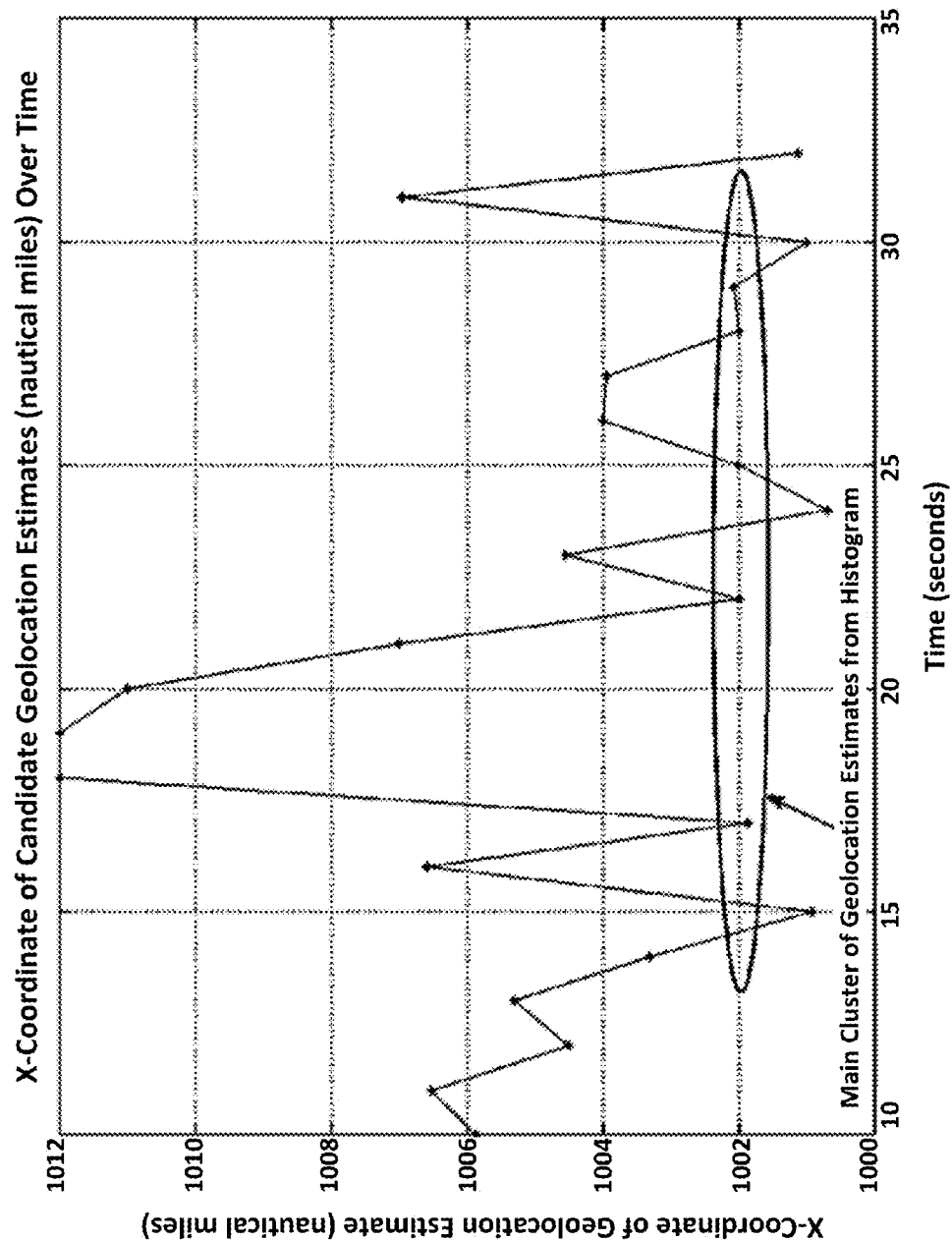
FIG. 3a graphically illustrates one axis of an example geolocation estimate set that can be used in the system/method of FIG. 2, in accordance with an embodiment of the present invention.

In general, the example method shown in FIG. 2 involves examining geolocation estimations obtained over time by a geolocation algorithm and determining an optimal solution based on those estimates. Thus, the method generally begins with receiving 201 a plurality of geolocation estimates. As previously explained, the format of the geolocation estimates will depend on the coordinate system being used in the given collection application. An example geolocation estimation set is shown in FIG. 3a. As can be seen, only one coordinate (the x-axis) of a solution set in earth-centered earth-fixed (ECEF) coordinates is shown. The methodology can operate on each coordinate/axis independently, so the methodology described with respect to the x-axis can be repeated for each of the y and z coordinates/axes (assuming a 3-D cartesian coordinate system). In this example case, the dataset provided includes 23 geolocation estimates collected over about a 22 second period of time. As can be further seen, while the x-coordinate data value for each of these 23 estimates varies from about 1000.8 to 1012 nautical miles (referenced to the center of the earth), there is a fairly dominant cluster around 1002 nautical miles. As will be appreciated in light of this disclosure, the clustering can be used to identify an optimal solution and can be better seen in the context of a histogram, in accordance with some embodiments of the present invention.

For a given axis, the method continues with determining 203 a bin size value for the histogram. In some such embodiments, the bin size value is determined by identifying the differences of the adjacent coordinate values and then averaging the absolute values of those differences to determine an average spacing between coordinate values. This average spacing can then be divided into the full dynamic range of the geolocation estimates and rounded to provide the number of bins. The number of bins can then be divided into the full dynamic range of the geolocation estimates to provide a suitable bin size. In the example dataset shown in FIG. 3a, the average difference between adjacent data points is about 2.88 nautical miles over a dynamic range of about 11 nautical miles, which yields a count of 4 bins (i.e., round[11/2.88]), thereby providing a bin size of about 2.75 nautical miles (i.e., 11/4). Other embodiments may assign a pre-established bin size, such as a bin size shown to consistently produce good results in a given application based on empirical and/or theoretical results from that application. In a more general sense, a bin size in the range of about 0.05 to 2.0 nautical miles may be suitable for many applications, in accordance with some embodiments. A maximum bin size may be assigned, such that any computed bin size that exceeds that maximum is rounded down to the maximum value. In one example embodiment, the maximum bin size is two nautical miles, while in another example case it is 0.2 nautical miles. In the example shown in FIG. 3a, for instance, the computed bin size value is about 2.75 nautical miles, but the actual bin size value is maxed out at 0.2 nautical miles.

Figure 3B:
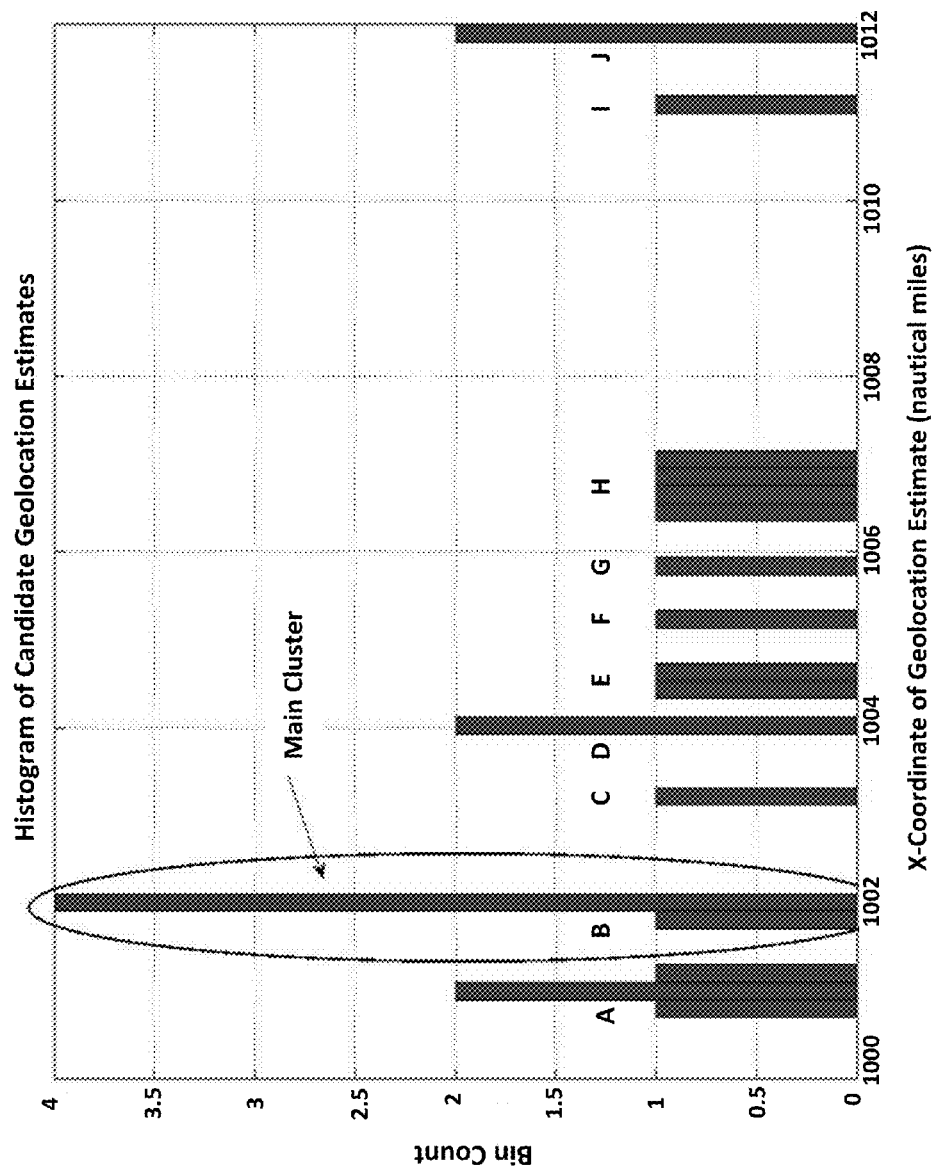
FIG. 3b is a histogram of the example geolocation estimate set shown in FIG. 3a, in accordance with an embodiment of the present invention.

The method continues with populating 205 a histogram with the coordinates of the geolocation estimates for the given axis, and using the computed or otherwise selected bin width from 203. The resulting histogram for the x-axis associated with the example geolocation dataset shown in FIG. 3a is shown in FIG. 3b. In this example case, the histogram covers a dynamic range of about 1000 to 1012 nautical miles, which is effectively divided into 60 bins of 0.2 nautical miles each (which may be, for instance, computed based on average distance between adjacent points in the dataset, or empirically set for a given application, as previously explained). Given the geolocation estimates, some of the bins will be populated with data but not necessarily all the bins will be populated.

Once the histogram is created, the method continues with identifying 207 a main bin cluster having the largest population. As previously explained, a bin is generally defined as a segment of distance along an axis of a given coordinate system and a bin cluster is defined as one or more consecutive adjacent bins containing non-zero counts and bounded by delimiters such as bins of count 0 (or some other relatively low count threshold such as 1 or 2) and/or the beginning and/or end of the histogram. As can be seen in the histogram of FIG. 3b, there are a total of 10 bin clusters in this example (designated A through J, respectively), where clusters A through I are bounded by bins of count 0 and bin cluster J is bounded by a bin of count 0 and the end of the histogram. As can be further seen in this example case, bin cluster B has the highest count of 5, while bin clusters A and H each have a count of 4, bin clusters D, E, and J each have a count of 2, and bin clusters C, F, G, and I each have a count of 1. Thus, bin cluster B can be designated as the main bin cluster in this example case. If two or more bin clusters have the same population count, then the one with the fewer number of bins can be chosen as the main cluster, in accordance with some such embodiments. If the bin clusters also have the same number of bins, then the bin cluster with the tallest bin can be chosen. Other appropriate tie breaking strategies can be used as well, as will be appreciated in light of this disclosure.

The method of this example embodiment then continues with optionally determining 209 whether sub-clustering is necessary to further improve the accuracy of the methodology. In accordance with some embodiments, all the geolocation estimates over time that fall into the main cluster can be tested for time gaps (non-adjacent estimates in time). These generally form sub-clusters within the main cluster. All combinations of sub-clusters can then be considered to find spatially overlapping sub-clusters. Geolocation estimates in the spatially overlapping sub-clusters can be combined to provide higher count sub-clusters, and estimates in lower count sub-clusters can be rejected. If there is more than one set of spatially overlapping sub-clusters, then the one with the greatest count can be chosen.

In response to determining at 209 that sub-clustering is not necessary (i.e., all solutions in the main cluster are adjacent in time), the method continues with computing 215 an average coordinate of geolocation estimates in the main cluster. Note that if sub-clustering were performed, this average coordinate could be based on the geolocation estimates remaining in the main cluster after sub-cluster rejection. The method continues with determining 217 if there is another axis to process for the given coordinate system. As previously noted, the x-axis coordinate of the geolocation estimates is shown in FIGS. 3a-b, so the result at 215 can be used as the $x_e$ coordinate of the closest-to-optimal answer. Thus, assuming a 3-D cartesian coordinate system, the method can be repeated for each of the y and z axes so as to further compute an average y-axis coordinate and an average z-axis coordinate, respectively, thereby providing the $y_e$ and $z_e$ coordinates of the closest-to-optimal answer. As indicated at 219, the resulting optimal emitter geolocation result can be identified as $x_e$, $y_e$, $z_e$.

The method may further continue with optionally converting 221 the geolocation estimates to a second coordinate system using the optimal emitter geolocation as an origin of that second system. For instance, in one such example case, the ECEF location thus found ($x_e$, $y_e$, $z_e$) is used as an origin to convert all the geolocation estimates to east/north/up (ENU) coordinates. The up coordinate can be dropped, and the entire histogram and clustering process can be repeated for the two coordinates, east and north. The final closest-to-optimal answer for that second coordinate system is the average of the spatial clusters of east and north. Converting from a 3-D coordinate system to a 2-D coordinate system may be beneficial in that a 2-D coordinate system will in general yield less error than a 3-D coordinate system.

Sub-Clustering

In response to determining at 209 that sub-clustering is necessary or otherwise desired (e.g., all solutions in the main cluster are not adjacent in time), the method may continue with a sub-clustering process. In the example embodiment shown in FIGS. 3a-b, four sub-clusters are formed, since only two of the five geolocation estimates in the main cluster are adjacent in time, as seen in the oval of FIG. 3a. The coordinate values in three of these sub-clusters overlap in the spatial coordinate and are retained, while the first sub-cluster can be rejected.

Figure 4A:
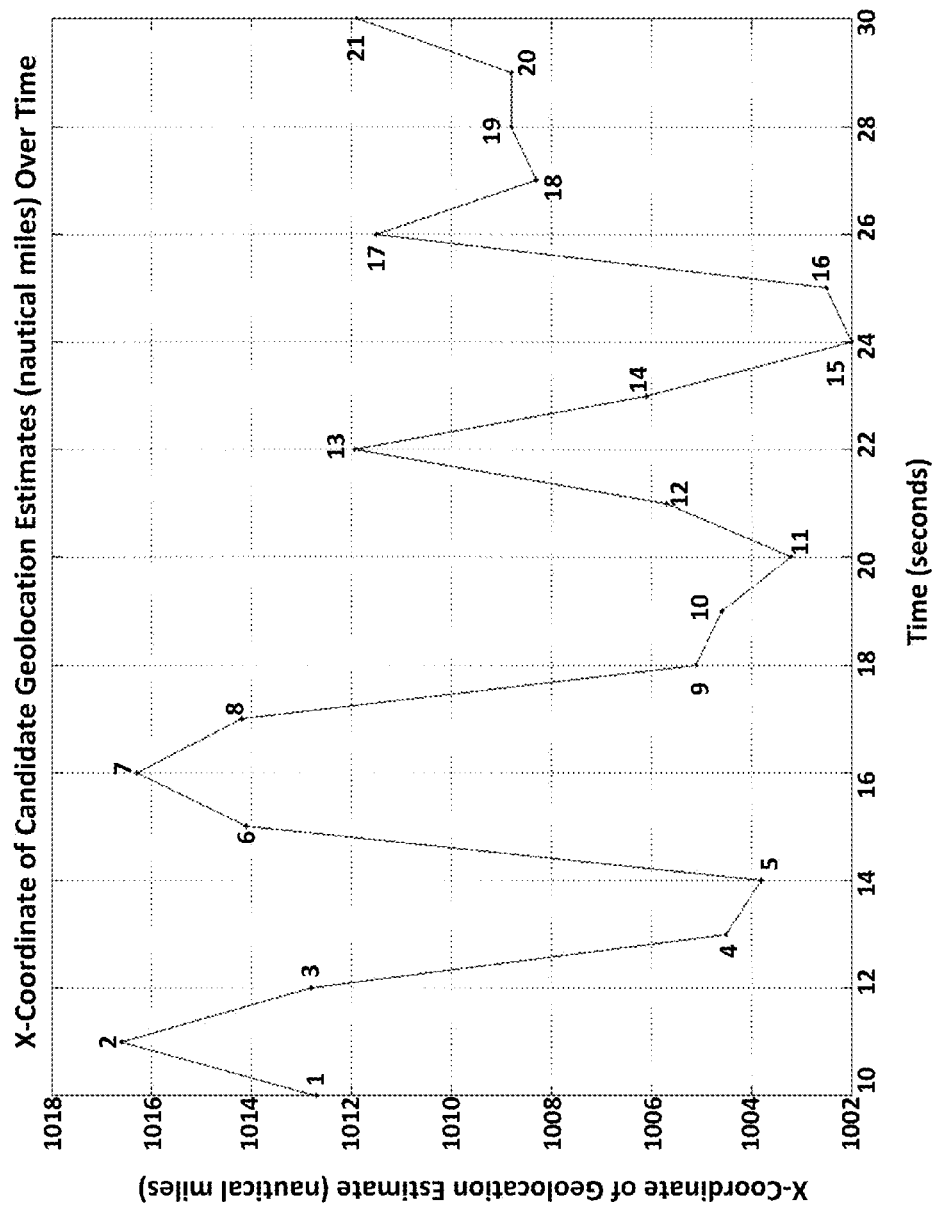
FIG. 4a graphically illustrates one axis of another example geolocation estimate set that can be used in the system/method of FIG. 2, in accordance with another embodiment of the present invention.
Figure 4B:
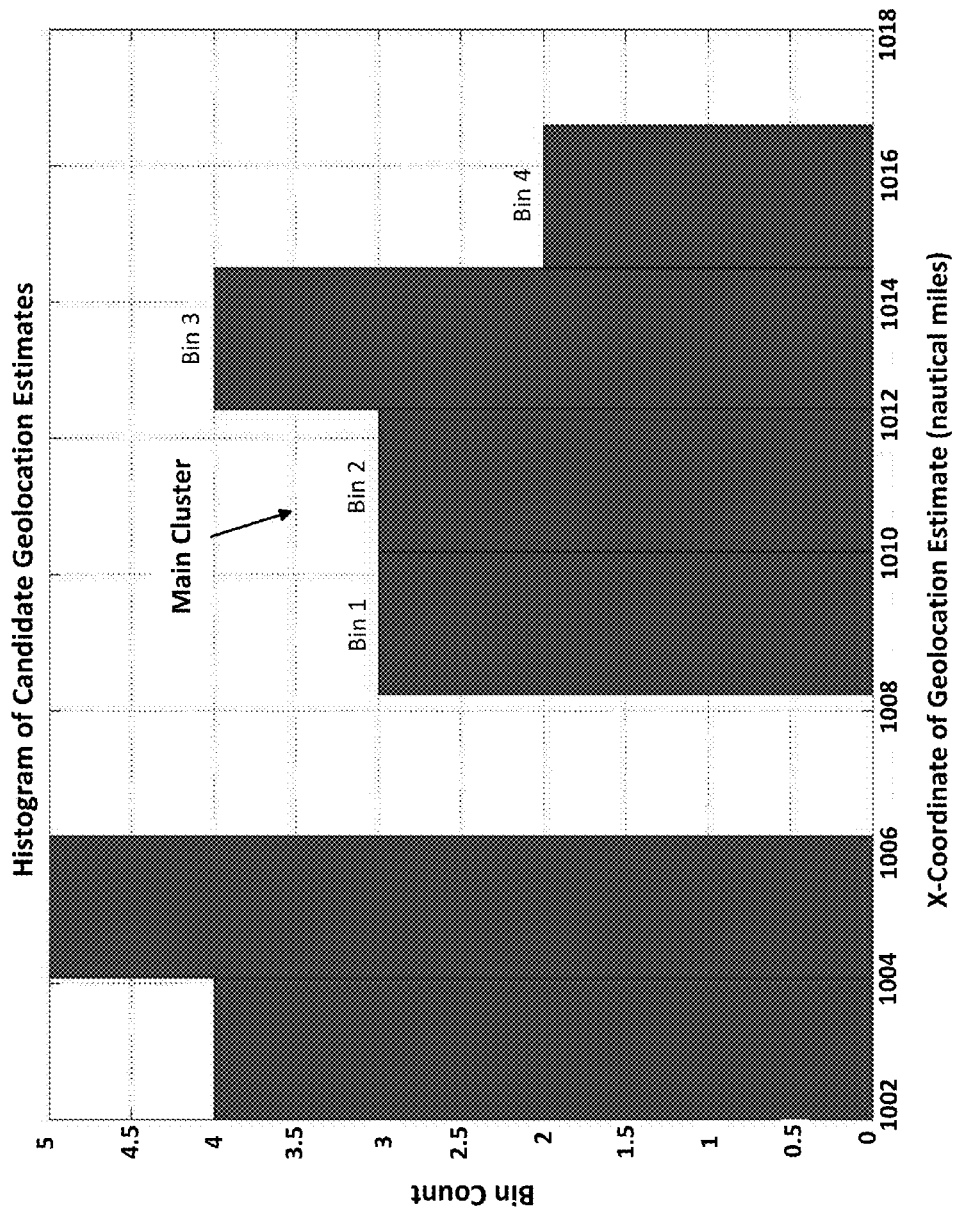
FIG. 4b is a histogram of the example geolocation estimate set shown in FIG. 4a, in accordance with an embodiment of the present invention.

A more detailed example of sub-clustering will now be discussed with respect to FIGS. 4a and 4b, as well as 211-213 of FIG. 2. The example case indicated in FIGS. 4a and 4b indicates a situation where sub-clustering may be helpful. Referring to the geolocation estimates diagram shown in FIG. 4a, there are a total of 21 estimates which were collected between 10 and 30 seconds (each geolocation estimate is labeled accordingly). This data is populated into a histogram as shown in FIG. 4b, wherein the bin width is set to 2 nautical miles (based on, for example, a pre-established maximum width or a width derived from the geolocation estimate dataset). In the histogram, two bin clusters are shown. One has 12 geolocation estimates and the other has 9, so the one with 12 is chosen as the main cluster.

Given the relatively wide bin width, sub-clustering may be helpful in improving accuracy of the result. So, assume the determination at 209 is answered in the affirmative. In such a case, the method continues with identifying 211 sub-clusters of the main bin cluster. This can be carried out in a number of ways, as will be appreciated in light of this disclosure. As can be seen, the geolocation estimates in the four bins of the main cluster are, respectively: 18,19,20 (Bin 1); 13,17,21 (Bin 2); 1,3,6,8 (Bin 3); and 2,7 (Bin 4). By listing these geolocation estimates in time order (1,2,3,6,7,8,13,17,18,19,20,21), it can be seen that there is a time gap between the first three geolocation estimates and the fourth, so the first three geolocation estimates (1,2,3) form a sub-cluster. There is also a time gap between estimates 8 and 13, and another between estimates 13 and 17. Thus, geolocation estimates 6,7,8 form a second sub-cluster, estimate 13 forms a third sub-cluster, and estimates 17,18,19,20,21 form a fourth sub-cluster. So, there are four sub-clusters in the main cluster of this example case, and in accordance with one embodiment of the present invention.

Once the sub-clusters have been identified, the method of this example embodiment continues with combining 213 spatially overlapping sub-clusters and rejecting sub-clusters having low population (relative to highest population sub-cluster (s)). In one such case, this can be accomplished by first identifying spatial overlaps of the sub-clusters. For instance, from the geolocation estimate plot of FIG. 4a, it can be seen that geolocation estimates 1,2,3 of the first sub-cluster have min/max values that spatially overlap the min/max values of the second cluster (estimates 6,7,8). The spatially overlapping first and second sub-clusters can be combined to form a sub-cluster having 6 geolocation estimates. The third sub-cluster comprising estimate 13 does not spatially overlap the first and second sub-clusters, nor does it spatially overlap the fourth sub-cluster. So, the third sub-cluster including only estimate 13 can be rejected. Thus, of the two remaining sub-clusters, one has 6 geolocation estimates (1,2,3,6,7,8) and the other has 5 geolocation estimates (17,18,19,20,21). The sub-cluster with the largest estimate count then can be selected as the main cluster (or refined main cluster, as the case may be) for purposes of subsequent processing at 215 and as previously explained, in accordance with some embodiments. If two or more sub-clusters have the same high count, then the sub-cluster that spans the shortest distance (based on geolocation estimates included therein) can be selected. Again, other appropriate tie breaking schemes can be used as well.

Such a cluster-based selection is effective as it exploits the aforementioned tendency of single-ship estimated geolocation data points to cluster about the true emitter location. More data points, clustered more closely about a particular distance, indicate a higher likelihood that the true location is present within the cluster. The data points in the selected cluster can then be averaged or otherwise evaluated to determine a closest to optimal value for each axis in the given coordinate system.

Emitter Locating System

As can be further seen with reference to FIG. 2, the functionality of the method shown at 201, 202, and 205 can be implemented in one or more modules of a system for locating a radar emitter. In this example case, a first module designated cluster ID module is provisioned, which may be divided into two or more sub-modules. In a similar fashion, the functionality of the method shown at 207 can be implemented in a second module designated main cluster ID module, which may be divided into two or more sub-modules. In a similar fashion, the functionality of the method shown at 215, 217, and 219 can be implemented in a third module designated optimal emitter geo coordinate module, which may be divided into two or more sub-modules. In a similar fashion, the optional functionality of the method shown at 211 and 213 can be implemented in a fourth module designated sub-cluster module, which may be divided into two or more sub-modules. In a similar fashion, the optional functionality of the method shown at 221 can be implemented in another module designated conversion module, which may be divided into two or more sub-modules.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method for locating a radar emitter, comprising:
    identifying, by a processor, a plurality of clusters of radar emitter geolocation data in a first axis of a first coordinate system, wherein each cluster includes a population of geolocation data points and is bound by delimiters;
    identifying, by a processor, among the plurality of clusters, a main cluster having the largest population of geolocation data points; and
    computing, by a processor, an average coordinate value from the geolocation data points in the main cluster, thereby providing at least part of an optimal emitter geolocation coordinate.

2. The method of claim 1 further comprising at least one of:
    repeating the method for a second axis of the first coordinate system, thereby providing another part of the optimal emitter geolocation coordinate; and
    repeating the method for a third axis of the first coordinate system, thereby providing another part of the optimal emitter geolocation coordinate.

3. The method of claim 1 wherein the delimiters that bound the clusters include at least one of bins having a count at or below a given threshold, a first distance specifying a beginning of a dynamic range reflected in the geolocation data points of the radar emitter geolocation data, and a second distance specifying an end of the dynamic range reflected in the geolocation data points of the radar emitter geolocation data.

4. The method of claim 3 wherein the count below a given threshold is zero.

5. The method of claim 1 wherein identifying a plurality of clusters comprises:
    determining a bin size for a histogram; and populating the histogram, using the bin size, with the geolocation data points of the radar emitter geolocation data.

6. The method of claim 5 wherein determining the bin size comprises:
computing an average distance between the geolocation data points of the radar emitter geolocation data, when those data points are sequentially arranged in time; and
computing the bin size based on the average distance and a total distance reflected in the geolocation data points of the radar emitter geolocation data.

7. The method of claim 5 wherein the bin size is determined empirically.

8. The method of claim 1 wherein the geolocation data points of the radar emitter geolocation data are earth-centered earth-fixed (ECEF) coordinates.

9. The method of claim 1 wherein if two or more clusters have the same largest population of geolocation data points, then the cluster associated with the smaller distance is chosen as the main cluster.

10. The method of claim 1 further comprising:
identifying sub-clusters within the main cluster;
combining spatially overlapping sub-clusters to form a sub-cluster having a larger population of geolocation data points; and
identifying a sub-cluster having the largest population and rejecting lower population sub-clusters, thereby providing a refined main cluster.

11. The method of claim 10 wherein if two or more sub-clusters have the same largest population of geolocation data points, then the sub-cluster that spans the longer distance is rejected.

12. The method of claim 10 wherein identifying sub-clusters within the main cluster comprises:
identifying time gaps between the geolocation data points when those data points are sequentially arranged in time, wherein a time gap is a delimiter between distinct sub-clusters.

13. The method of claim 1 further comprising:
converting the geolocation data points of the radar emitter geolocation data to a second coordinate system using the optimal emitter geolocation coordinate as an origin; and
repeating the method for each axis, or a subset of axes, of the second coordinate system.

14. The method of claim 1 further comprising the preliminary step of:
receiving the geolocation data points of the radar emitter geolocation data.

15. A non-transient computer-readable medium storing instructions thereon that when executed by one or more processors, cause the following process for locating a radar emitter to be carried out:
identifying a plurality of clusters of radar emitter geolocation data in a first axis of a first coordinate system, wherein each cluster includes a population of geolocation data points and is bound by delimiters;
identifying, among the plurality of clusters, a main cluster having the largest population of geolocation data points; and
computing an average coordinate value from the geolocation data points in the main cluster, thereby providing at least part of an optimal emitter geolocation coordinate.

16. The computer-readable medium of claim 15 wherein the process further comprises at least one of:
repeating the method for a second axis of the first coordinate system, thereby providing another part of the optimal emitter geolocation coordinate; and
repeating the method for a third axis of the first coordinate system, thereby providing another part of the optimal emitter geolocation coordinate.

17. The computer-readable medium of claim 15 wherein identifying a plurality of clusters comprises:
populating a histogram with the geolocation data points of the radar emitter geolocation data.

18. The computer-readable medium of claim 15 wherein if two or more clusters have the same largest population of geolocation data points, then the cluster associated with the smaller distance is chosen as the main cluster.

19. The computer-readable medium of claim 15 wherein the process further comprises:
identifying sub-clusters within the main cluster;
combining spatially overlapping sub-clusters to form a sub-cluster having a larger population of geolocation data points; and
identifying a sub-cluster having the largest population and rejecting lower population sub-clusters, thereby providing a refined main cluster.

20. A system for locating a radar emitter, comprising:
a first module for identifying a plurality of clusters of radar emitter geolocation data in at least one axis of a coordinate system, wherein each cluster includes a population of geolocation data points and is bound by delimiters;
a second module for identifying, among the plurality of clusters, a main cluster having the largest population of geolocation data points; and
a third module for computing an average coordinate value from the geolocation data points in the main cluster, thereby providing at least part of an optimal emitter geolocation coordinate.

21. The system of claim 20 further comprising:
a fourth module for identifying sub-clusters within the main cluster;
a fifth module for combining spatially overlapping sub-clusters to form a sub-cluster having a larger population of geolocation data points; and
a sixth module for identifying a sub-cluster having the largest population and rejecting lower population sub-clusters, thereby providing a refined main cluster.

22. The system of claim 20 wherein each of the first, second, and third modules are implemented in firmware embedded in a microcontroller having I/O capability for receiving the geolocation data and outputting the optimal emitter geolocation coordinate.

23. The system of claim 20 wherein each of the first, second, and third modules comprise gate-level logic.

24. The system of claim 20 wherein each of the first, second, and third modules are implemented in executable instructions stored in an electronic memory, the system further comprising one or more processors configured to execute the first, second, and third modules.

* * * * *